(12) United States Patent
Asif Bashir et al.

(10) Patent No.: US 11,557,314 B1
(45) Date of Patent: Jan. 17, 2023

(54) WRITE HEADS HAVING CONDUCTING SIDE GAP FOR DIRECTING CURRENT

(71) Applicant: Western Digital Technologies, Inc., San Jose, CA (US)

(72) Inventors: Muhammad Asif Bashir, San Jose, CA (US); Zhigang Bai, Fremont, CA (US); Yaguang Wei, Pleasanton, CA (US); Terence Lam, Cupertino, CA (US); Youfeng Zheng, San Jose, CA (US); Changqing Shi, San Ramon, CA (US); Michael Kuok San Ho, Emerald Hills, CA (US); Xinjiang Shen, Fremont, CA (US); Suping Song, Fremont, CA (US); Lijie Guan, San Jose, CA (US); Venkatesh Chembrolu, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/453,354

(22) Filed: Jun. 26, 2019

(51) Int. Cl.
*G11B 5/235* (2006.01)
*G11B 5/23* (2006.01)
(Continued)

(52) U.S. Cl.
CPC ............ *G11B 5/235* (2013.01); *G11B 5/1278* (2013.01); *G11B 5/23* (2013.01); *G11B 5/315* (2013.01);
(Continued)

(58) Field of Classification Search
None
See application file for complete search history.

(56) References Cited

U.S. PATENT DOCUMENTS

| 7,649,712 B2 | 1/2010 | Le et al. |
| 8,137,570 B2 | 3/2012 | Le |

(Continued)

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

Mallary, Mike et al.; "Head and Media Challenges for 3 Tb/in2 Microwave-Assisted Magnetic Recording"; IEEE Transactions on Magnetics, vol. 50, No. 7, Jul. 2014 (8 pages).

(Continued)

*Primary Examiner* — Craig A. Renner
(74) *Attorney, Agent, or Firm* — Patterson & Sheridan, LLP; Steven H. VerSteeg

(57) ABSTRACT

Embodiments of the present disclosure generally relate to magnetic recording systems, and more particularly to a magnetic recording system with a current-assisted write head. The write head comprises a main pole, a trailing shield disposed above the main pole, a trailing gap disposed between the main pole and the trailing shield, a side shield surrounding three sides of the main pole, the side shield being in contact with and disposed below the trailing shield and the trailing gap, and a side gap disposed between the side shield and each of the three sides of the main pole. The side gap comprises a non-magnetic electrically-conducting material to dissipate heat away from the main pole, lowering the resistance and temperature rise due to heating. The trailing gap may further comprise a non-magnetic electrically-conducting material. The write head may have a two terminal or three terminal connection configuration.

22 Claims, 12 Drawing Sheets

(51) Int. Cl.
*G11B 5/31* (2006.01)
*G11B 5/127* (2006.01)
*G11B 5/39* (2006.01)
*G11B 5/00* (2006.01)

(52) U.S. Cl.
CPC .......... *G11B 5/3133* (2013.01); *G11B 5/3912* (2013.01); *G11B 2005/0024* (2013.01)

(56) References Cited

U.S. PATENT DOCUMENTS

| | | | |
|---|---|---|---|
| 8,472,135 B1* | 6/2013 | Kusukawa et al. | G11B 5/3146 360/110 |
| 8,582,240 B1 | 11/2013 | Chen et al. | |
| 8,842,387 B1 | 9/2014 | Horide et al. | |
| 8,861,137 B1 | 10/2014 | Lam et al. | |
| 8,988,826 B2 | 3/2015 | Sugiyama et al. | |
| 9,142,227 B1 | 9/2015 | Etoh et al. | |
| 9,230,571 B1 | 1/2016 | Chen et al. | |
| 9,275,672 B2 | 3/2016 | Shiroishi et al. | |
| 9,355,655 B1* | 5/2016 | Udo et al. | G11B 5/3146 |
| 9,368,135 B2 | 6/2016 | Gao | |
| 9,881,637 B1 | 1/2018 | Wilson et al. | |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,762,917 B1* | 9/2020 | Le et al. | G11B 5/3133 |
| 2006/0044682 A1 | 3/2006 | Le et al. | |
| 2008/0304176 A1 | 12/2008 | Takagishi et al. | |
| 2009/0059423 A1 | 3/2009 | Kamada et al. | |
| 2009/0310244 A1 | 12/2009 | Shimazawa et al. | |
| 2011/0090595 A1* | 4/2011 | Hirata et al. | G11B 5/1278 360/125.03 |
| 2011/0090603 A1 | 4/2011 | Bai | |
| 2012/0092787 A1* | 4/2012 | Koizumi | G11B 5/1278 360/123.01 |
| 2013/0063837 A1* | 3/2013 | Udo et al. | G11B 5/3146 360/125.29 |
| 2013/0242431 A1* | 9/2013 | Hosomi et al. | G11B 5/235 360/119.02 |
| 2013/0250456 A1 | 9/2013 | Kamada et al. | |
| 2014/0139952 A1 | 5/2014 | Takeo et al. | |
| 2014/0177100 A1 | 6/2014 | Sugiyama et al. | |
| 2015/0043106 A1* | 2/2015 | Yamada et al. | G11B 5/1278 360/123.05 |
| 2015/0098150 A1 | 4/2015 | Chiu et al. | |
| 2015/0109699 A1* | 4/2015 | Boone et al. | G11B 5/3146 360/125.32 |
| 2015/0310881 A1* | 10/2015 | Koui | G11B 5/314 360/235.4 |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

OTHER PUBLICATIONS

Tagawa et al. "Advantage of MAMR Read-Write Performance," IEEE Transactions on Magnetics, vol. 52, No. 9, Sep. 2016, 4 pages.

* cited by examiner

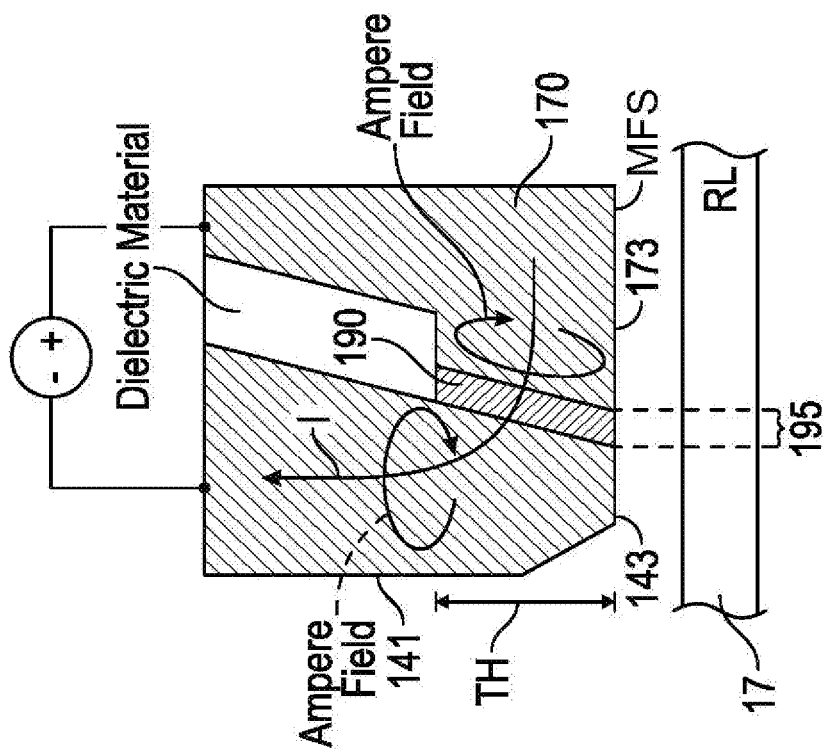
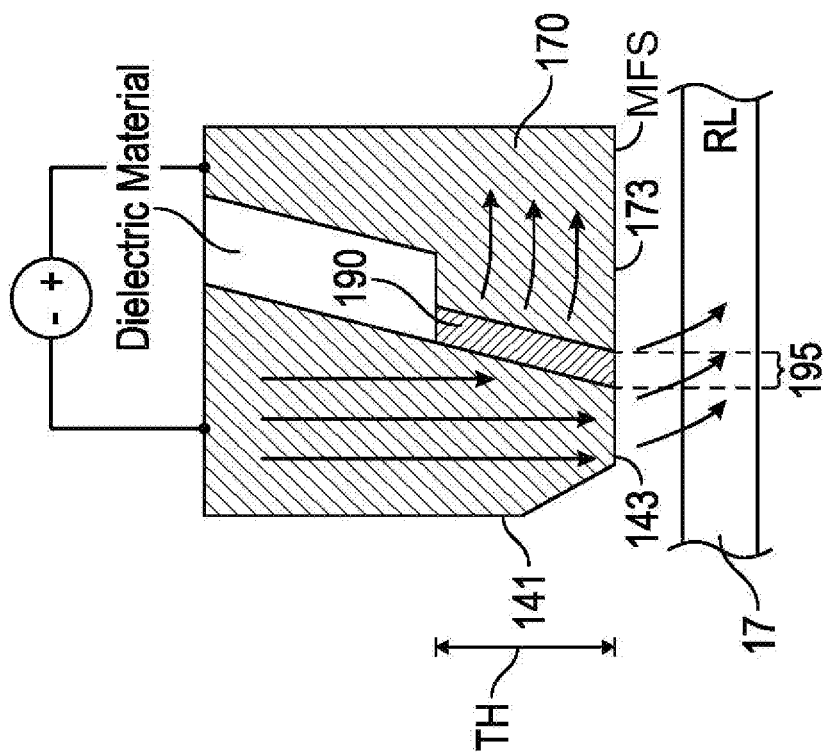

WRITE HEADS HAVING CONDUCTING SIDE GAP FOR DIRECTING CURRENT

BACKGROUND OF THE DISCLOSURE

Field of the Disclosure

Embodiments of the present disclosure generally relate to magnetic recording systems, and more particularly to a magnetic recording system with a current-assisted write head.

Description of the Related Art

Over the past few years, various magnetic recording methods have been studied to improve the areal density of a magnetic media device, such as a hard disk drive (HDD). Write heads in HDDs can have a significant effect on the overall performance and reliability of the recording device. Write heads may be designed to achieve specific advantages, such as improved performance, but may consequently have a negative impact on other characteristics, such as decreased reliability.

For example, HDD designs where a current applied through the write head is used to write data to media, higher amounts of current being applied to the write head cause the temperature of the write head to increase. Due to the amount of heat being generated, the current flowing through the write head can cause the write head to degrade at the media facing surface (MFS). As the main pole degrades at the MFS, the performance and reliability of the write head decreases. As the current causes the write head to increasingly heat up, the write head may eventually deform or break down, rendering the write head inoperable. Thus, many write heads are unable to handle larger amounts of current without breaking down.

Therefore, there is a need in the art for an improved write head design.

SUMMARY OF THE DISCLOSURE

Embodiments of the present disclosure generally relate to magnetic recording systems, and more particularly to a magnetic recording system with a current-assisted write head. The write head comprises a main pole, a trailing shield disposed above the main pole, a trailing gap disposed between the main pole and the trailing shield, a side shield surrounding three sides of the main pole, the side shield being in contact with and disposed below the trailing shield and the trailing gap, and a side gap disposed between the side shield and each of the three sides of the main pole. The side gap comprises a non-magnetic electrically-conducting material to dissipate heat away from the main pole, lowering the resistance and temperature rise due to heating. The trailing gap may further comprise a non-magnetic electrically-conducting material. The write head may have a two terminal or three terminal connection configuration.

In one embodiment, a magnetic recording write head comprises a main pole, a trailing shield disposed above the main pole, and a trailing gap disposed between the main pole and the trailing shield, the trailing gap in contact with a first surface of the main pole. A first portion of the trailing gap and a second portion of the trailing gap each comprise a non-magnetic electrically-conducting material. The write head further comprises a side shield surrounding a second surface, a third surface, and a fourth surface of the main pole, the side shield being in contact with and disposed below the trailing shield and the trailing gap, and a side gap disposed between the side shield and the second, third, and fourth surfaces of the main pole, the side gap being in contact with the trailing gap. The side gap comprises a non-magnetic electrically-conducting material.

In another embodiment, a magnetic recording write head comprises a main pole, a trailing shield disposed above the main pole, and a trailing gap disposed between the main pole and the trailing shield, the trailing gap in contact with a first surface of the main pole. The trailing gap comprises an electrically-insulating material. The write head further comprises a side shield surrounding a second surface, a third surface, and a fourth surface of the main pole, the side shield being in contact with and disposed below the trailing shield and the trailing gap, and a side gap disposed between the side shield and the second, third, and fourth surfaces of the main pole, the side gap comprising a non-magnetic electrically-conducting material.

In yet another embodiment, a magnetic recording write head comprises a main pole, a trailing shield disposed above the main pole, and a trailing gap disposed between the main pole and the trailing shield, the trailing gap in contact with a first surface of the main pole. The trailing gap comprises a non-magnetic electrically-conducting material. The write head further comprises a side shield surrounding a second surface, a third surface, and a fourth surface of the main pole, the side shield being in contact with and disposed below the trailing shield and the trailing gap, and a side gap disposed between the side shield and the second, third, and fourth surfaces of the main pole the side gap being in contact with the trailing gap. The side gap comprises a non-magnetic electrically-conducting material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2C illustrates a cross-section view of the write head of FIGS. 2A-2B showing magnetic flux lines from the write field when the write head is operating, according to one embodiment.

FIG. 2D illustrates a cross-section view of the write head of FIGS. 2A-2B showing the electrical current from the trailing shield when the write head is operating, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to magnetic recording systems, and more particularly to a magnetic recording system with a current-assisted write head. The write head comprises a main pole, a trailing shield disposed above the main pole, a trailing gap disposed between the main pole and the trailing shield, a side shield surrounding three sides of the main pole, the side shield being in contact with and disposed below the trailing shield and the trailing gap, and a side gap disposed between the side shield and each of the three sides of the main pole. The side gap comprises a non-magnetic electrically-conducting material to dissipate heat away from the main pole, lowering the resistance and temperature rise due to heating. The trailing gap may further comprise a non-magnetic electrically-conducting material. The write head may have a two terminal or three terminal connection configuration.

Figure 1:
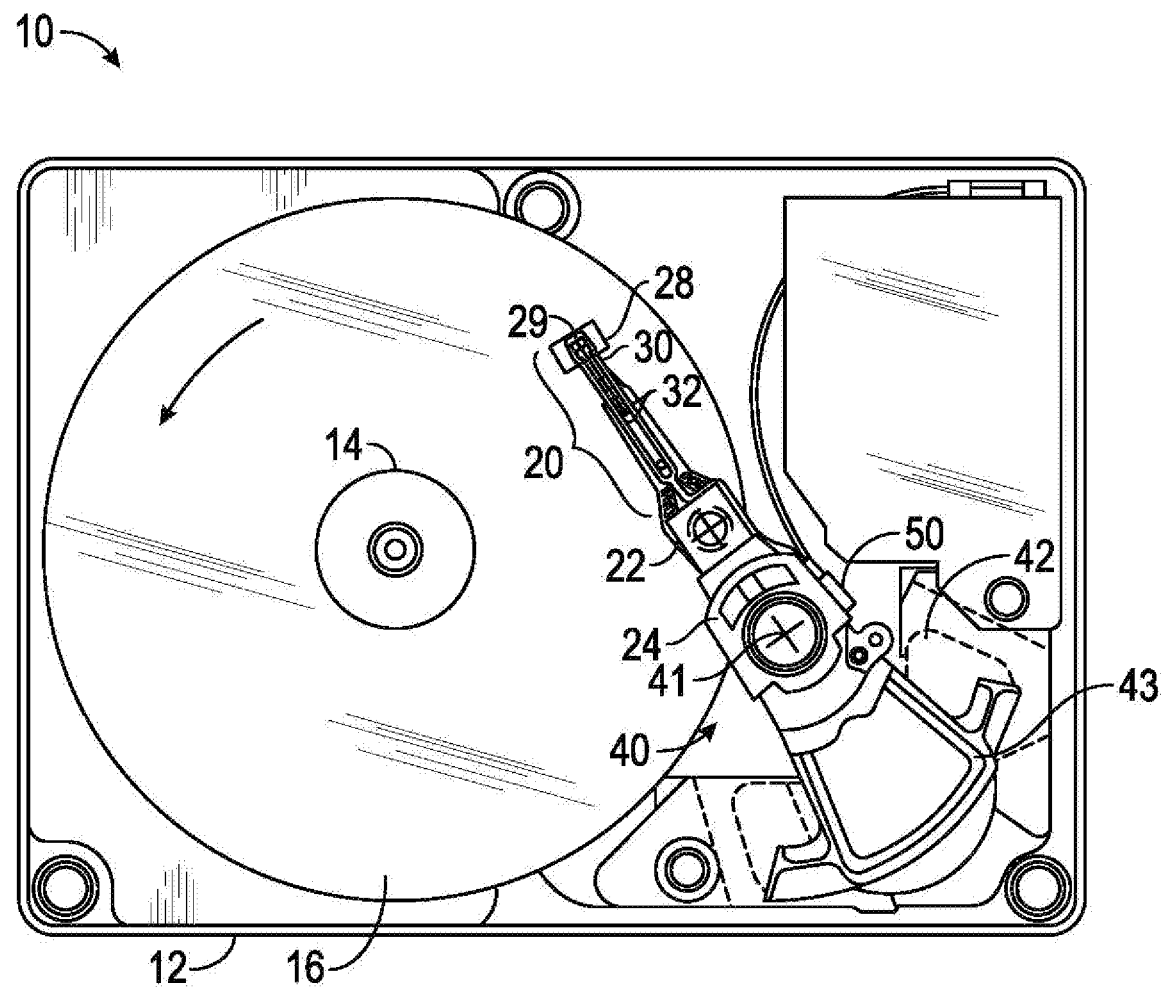
FIG. 1 is a top view of a conventional head/disk assembly of a hard disk drive, according to embodiments disclosed herein.

FIG. 1 is a top view of a conventional head/disk assembly of a hard disk drive 10 with the cover removed that may function as a current assisted magnetic recording disk drive, according to embodiments disclosed herein. The disk drive 10 includes a rigid base 12 supporting a spindle 14 that supports a stack of disks, including top disk 16. The spindle 14 is rotated by a spindle motor (not shown) for rotating the disks in the direction shown by the curved arrow on disk 16.

The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E block 24. Each flexure 30 is attached to a gas-bearing slider 28. A magnetic recording read/write head 29 is located at the end or trailing surface of slider 28. In some embodiments of this disclosure, the write head 29 optionally incorporates an electrically-conductive layer in the trailing gap.

The flexure 30 enables the slider 28 to "pitch" and "roll" on a gas bearing (typically air or helium) generated by the rotating disk 16. The disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
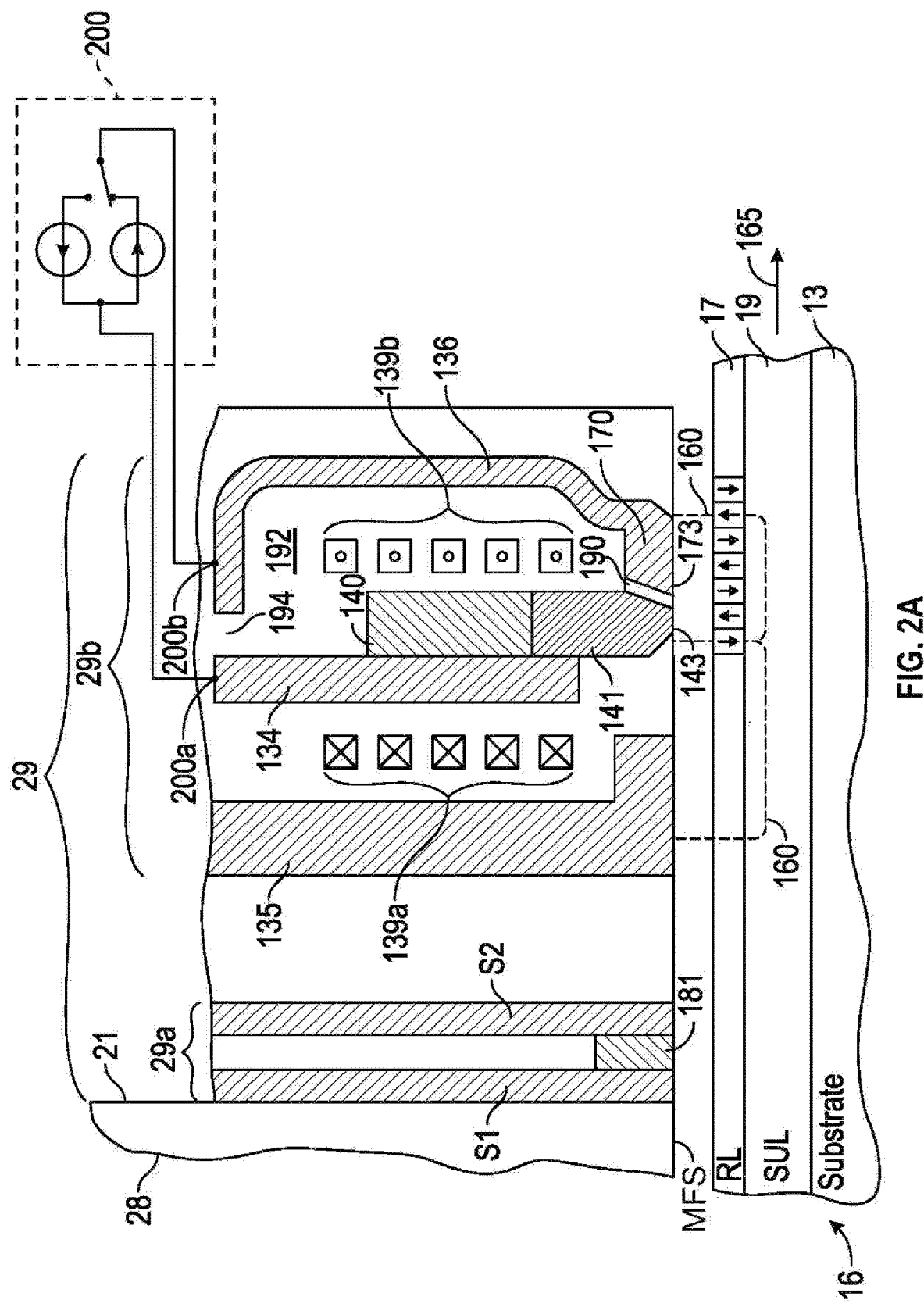
FIG. 2A is a cross-sectional view of a perpendicular magnetic recording write head, according to embodiments disclosed herein.

FIG. 2A is a side sectional view (not to scale) of a perpendicular magnetic recording write head 29b with a non-magnetic electrically-conductive layer 190 incorporated in the trailing gap, a read head 29a, and a recording disk 16 taken through a central plane that intersects a data track on the disk 16. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 that has a disk-facing surface or MFS and includes read head 29a and write head 29b. Read head 29a includes a magnetoresistive (MR) read element or sensor 181 located between two magnetic shields S1, S2.

The current-assisted write head 29b comprises a perpendicular magnetic recording (PMR) write head and includes a yoke structure with a main pole recessed portion 134, a main pole 141 having an upper portion 140 and a disk-facing end 143, an optional first flux return pole 135, second flux return pole 136, magnetic trailing shield 170 with disk-facing end 173, and conductive layer 190. The electrically-conductive layer 190 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. The main pole recessed portion 134, main pole 141, return poles 135, 136, and trailing shield 170 are formed of ferromagnetic materials, typically alloys of one or more of Co, Fe and Ni. The main pole 141 is typically formed of a high-moment CoFe alloy.

The write head 29b also includes a thin film coil 139a, 139b shown in section around main pole recessed portion 134. The write coil 139a, 139b is a helical coil wrapped around main pole recessed portion 134, but the write coil may also be a conventional dual "pancake" coil in which all the coil sections are in substantially the same plane and wrapped around the yoke. A flared main pole 141 is part of the main pole recessed portion 134 and has a pole tip with an end 143 that faces the outer surface of disk 16. Write current through coil 139a, 139b induces a magnetic field (shown by dashed line 160) from the main pole 141 that passes through the RL 17 (to magnetize the region of the RL 17 beneath the main pole end 143), through the flux return path provided by the SUL 19, and back to the end of optional first return pole 135 and end 173 of trailing shield 170.

The write head 29b also includes electrical circuitry 200 electrically connected to the main pole recessed portion 134 and the second return pole 136. The circuitry 200 may include a voltage or current source (or a connection to an external voltage or current source) and one or more switching devices, such as transistors or relays that can switch the voltage or current on and off. The circuitry 200 is configured to provide a current or voltage to the main pole recessed portion 134 and the return pole 136. For example, the circuitry 200 provides a current between the main pole recessed portion 134 and the return pole 136/trailing shield 170 that flows through main pole 141 and conductive layer 190 in the write gap between the main pole 141 and trailing shield 170. The current through conductive layer 190 generates an Ampere field substantially orthogonal to the magnetic flux in main pole 141 to facilitate the reversal or switching of the magnetization of main pole 141 during writing. An insulating material portion 192, for example alumina, is provided around the magnetic coil between the main pole recessed portion 134, the trailing shield 170 and the return pole 136. An electrically insulating material layer 194, for example alumina, can be provided between end portions of the main pole recessed portion 134 and the return pole 136 where the circuitry connections (i.e., electrical contacts 200a, 200b attached to the ends of the main pole recessed portion 134 and the return pole 136, respectively) are made (i.e., distal from the MFS).

The read/write head 29 is typically formed as a series of thin films deposited on a trailing surface 21 of the slider 28 that has its MFS supported above the surface of disk 16. The MR read head 29a is comprised of an MR sensor 181 located between MR shields S1 and S2 and is deposited on the trailing surface 21 end of the slider 28 prior to the deposition of the layers making up the write head 29b. In FIG. 2A, the disk 16 moves past the write head 29b in the direction indicated by arrow 165, and as such, the portion of the slider 28 that supports the read head 29a and write head 29b is often called the slider "trailing" end, and the surface 21 perpendicular to the slider MFS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely directed magnetized regions are detectable by the MR sensor 181 as the recorded bits.

Figure 2B:
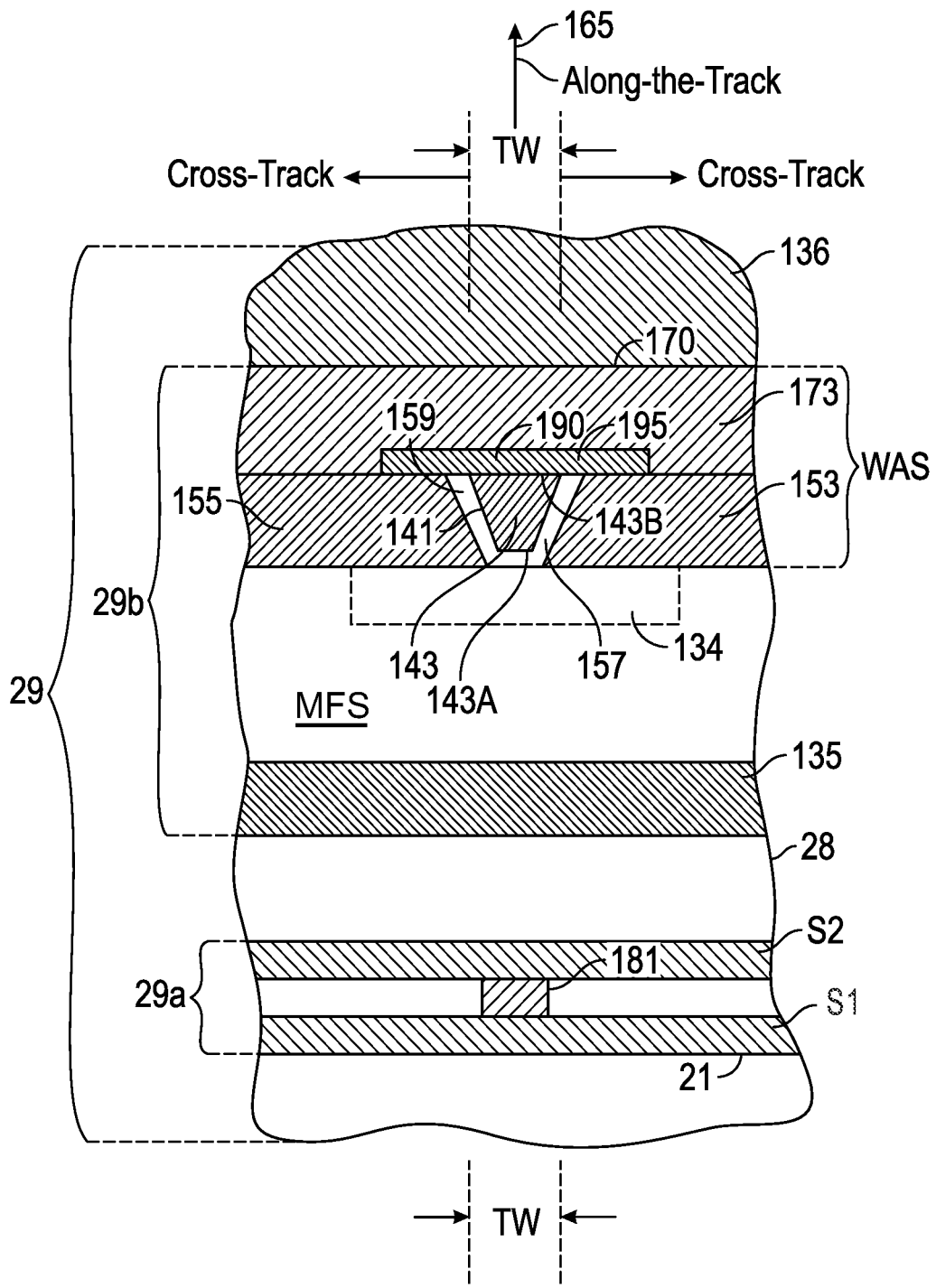
FIG. 2B is a media facing surface view of the write head of FIG. 2A.

FIG. 2B is a view (not to scale) that illustrates the read head 29a and current-assisted write head 29b as seen from the disk 16. The MFS is the recording layer facing surface of the slider 28 that faces the disk 16 (shown in FIG. 2A) and is shown without the thin protective overcoat typically present in an actual slider. The recording layer facing surface shall mean the surface of the slider 28 that is covered with a thin protective overcoat, the actual outer surface of the slider if there is no overcoat, or the outer surface of the overcoat. The phrase "substantially at the recording layer facing surface" shall mean actually at the surface or slightly recessed from the surface.

The disk 16 (shown in FIG. 2A) moves relative to the read/write head 29 along a line or direction 165, which is called the along-the-track line or direction. The line or direction perpendicular to direction 165 and parallel to the plane of the MFS is called the cross track line or direction. The main pole 141, often referred to as a write pole, has an end 143 at the MFS. The main pole end 143 has a leading edge 143A and a trailing edge 143B. The cross-track width of main pole trailing edge 143B substantially defines the track width (TW) of the data tracks in the RL 17 (shown in FIG. 2A). The main pole recessed portion 134 is shown with dashed lines because it is recessed from the MFS (shown in FIG. 2A).

The side shields 153, 155 are disposed on opposite sides of the non-magnetic electrically-insulating side gaps 157, 159. The side shields 153, 155 may comprise a third section disposed below the main pole leading edge 143A. A trailing shield 170 with an end 173 at the MFS is spaced from the main pole trailing edge 143B in the along-the-track direction by the trailing gap 195, sometimes referred to as a write gap. The shields 170, 153, 155 all have ends substantially at the MFS and are typically formed of a ferromagnetic material like a NiFe, CoFe or NiFeCo alloy. The shields 170, 153, 155 may be formed as a single-piece structure to form a wraparound shield (WAS) that substantially surrounds the main pole end 143. The non-magnetic electrically-conductive layer 190 is in the trailing gap 195 between the main pole trailing edge 143B and the trailing shield 170. In the embodiment of FIG. 2B, the conductive layer 190 has a cross-track width equal to or less than the cross-track width of the main pole trailing edge 143B, and a thickness in the along-the-track direction typically in the range of about 12 to 30 nm.

The WAS alters the angle of the write field and improves the write field gradient at the point of writing, and shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the trailing shield 170.

The general operation of the current-assisted write head with an electrically-conductive layer in the trailing gap will be explained with the side sectional views of FIGS. 2C-2D. The conductive layer 190 in the trailing gap 195 has a throat height (TH) as measured from the MFS to an end recessed from the MFS. The typical throat height may be in the range of about 30 to 70 nm. The area above the conductive layer 190 in the trailing gap 195 is filled with dielectric material. The typical along-the-track thickness of the conductive layer 190 is in the range of about 12 to 30 nm.

In FIG. 2C, a magnetic write field in the main pole 141 is directed substantially perpendicularly toward the RL 17 and into the trailing shield 170 when write current is directed through the coil 139a, 139b (shown in FIG. 2A). The arrows in FIG. 2C represent the magnetic flux from the write field. Simultaneously, as shown in FIG. 2D, electrical current (I) from the circuitry 200 (shown in FIG. 2A) passes from the trailing shield 170 through the conductive layer 190 to the main pole 141 (or alternatively from the main pole 141 to the trailing shield 170).

According to Ampere's law, this current will produce a circular magnetic field that is in the direction substantially transverse to the direction of current flow. Since the current direction is in substantially the same direction as the magnetic flux, or magnetization in the main pole 141, this Ampere field is also transverse to the magnetization of the main pole 141. This produces a transverse magnetization component with respect to the flux flow direction in the main pole 141. This creates a torque on the main pole magnetization that makes the flux reversal in the main pole faster and with less jitter in the timing of the write pulses. This increased speed in magnetization reversal or switching of the main pole and the reduced timing jitter enables an increase in disk areal data density.

For the Ampere field to improve the main pole 141 magnetization switching and thus reduce the soft error rate (SER) in the written data, a high bias voltage needs to be applied. However, this results in current crowding near the conductive layer, which generates a hot spot near the main pole 141. This can cause corrosion of the materials surrounding the main pole 141.

Figure 3A:
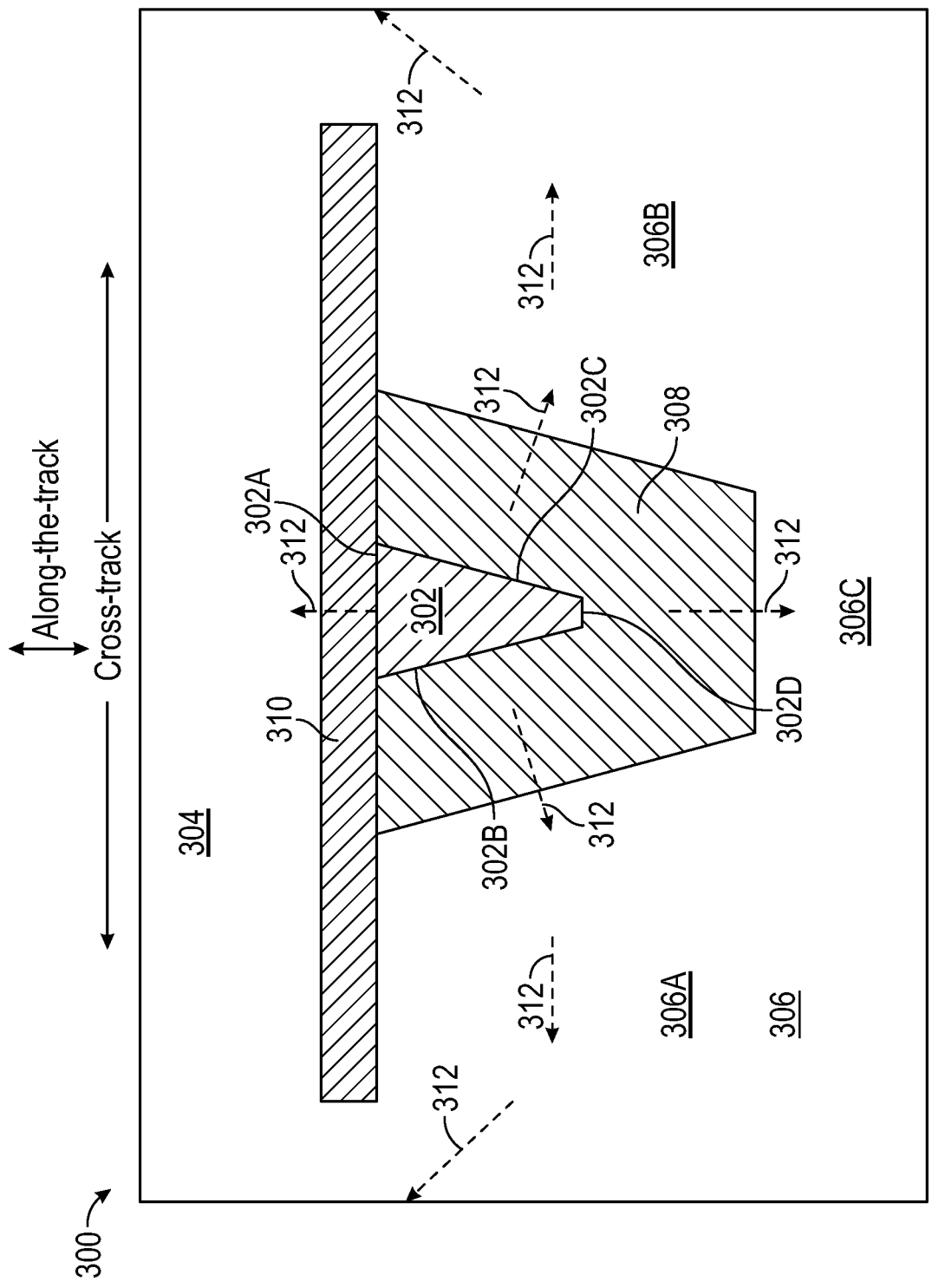
FIG. 3A illustrates a media facing surface view of a write head, according to one embodiment.

FIG. 3A illustrates a MFS view of a write head 300, according to one embodiment. The write head 300 may be the write head 29b of FIGS. 2A-2D. The write head 300 comprises a main pole 302, which may be referred to as a write pole, disposed below a trailing shield 304. The main pole 302 may be the main pole 141 of FIGS. 2A-2D. A trailing gap 310 is disposed between the main pole 302 and the trailing shield 304. A first surface 302A of the main pole 302 is in contact with the trailing gap 310. The trailing gap 310 has a greater cross-track width than the main pole 302. The trailing gap 310 comprises a non-magnetic electrically-conductive material. The trailing gap 310 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. The non-magnetic electrically-conductive material of the trailing gap 310 may be the conductive layer 190 of FIGS. 2A-2D. The trailing gap 310 may further comprise a dielectric layer (not shown) disposed adjacent to the trailing shield 304. The trailing gap 310 may have a thickness of about 12 to 30 nm in the along-the-track direction. While not shown in the write head 300, a hot seed layer may be disposed between the trailing gap 310 and the trailing shield 304.

A second surface 302B, a third surface 302C, and a fourth surface 302D of the main pole 302 are surrounded by a side shield 306 comprised of three sections 306A, 306B, 306C. The section 306C of the side shield 306 disposed below the main pole 302 on the side opposite the trailing shield 304 may often be referred to as a leading shield. The side shield 306 is disposed below the trailing shield 304 and the trailing gap 310, and sections 306A and 306B of the side shield 306 are in contact with the trailing gap 310. A side gap 308 is disposed between the main pole 302 and each section 306A, 306B, 306C of the side shield 306. The side gap 308 is in contact with the main pole 302, the trailing gap 310, and the side shield 306. The side gap 308 comprises a non-magnetic electrically-conductive material. The side gap 308 may comprise the same material as the trailing gap 310, or the side gap 308 may comprise a different material than the trailing gap 310. The side gap 308 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. While the main pole 302 is described as having four surfaces 302A-302D, the main pole 302 may comprise three surfaces.

The trailing gap 310 and the side gap 308 each comprising a non-magnetic electrically-conductive material enables the trailing gap 310 and the side gap 308 to act as a conductor having an increased area. Increasing the area of the conductor allows the conductor to act as a heat sink, which reduces both the electrical resistance and temperature rise during operation of the write head 300 to improve reliability. As such, the current 312, represented by the arrows labeled 312, is spread to the side shield 306 and trailing shield 304, which reduces the hot spot near the main pole 302. For example, when applying current 312 to the write head 300, the write head 300 may have a device resistance of about 6.2 ohms and a temperature increase of about 35 degrees Celsius.

Figure 3B:
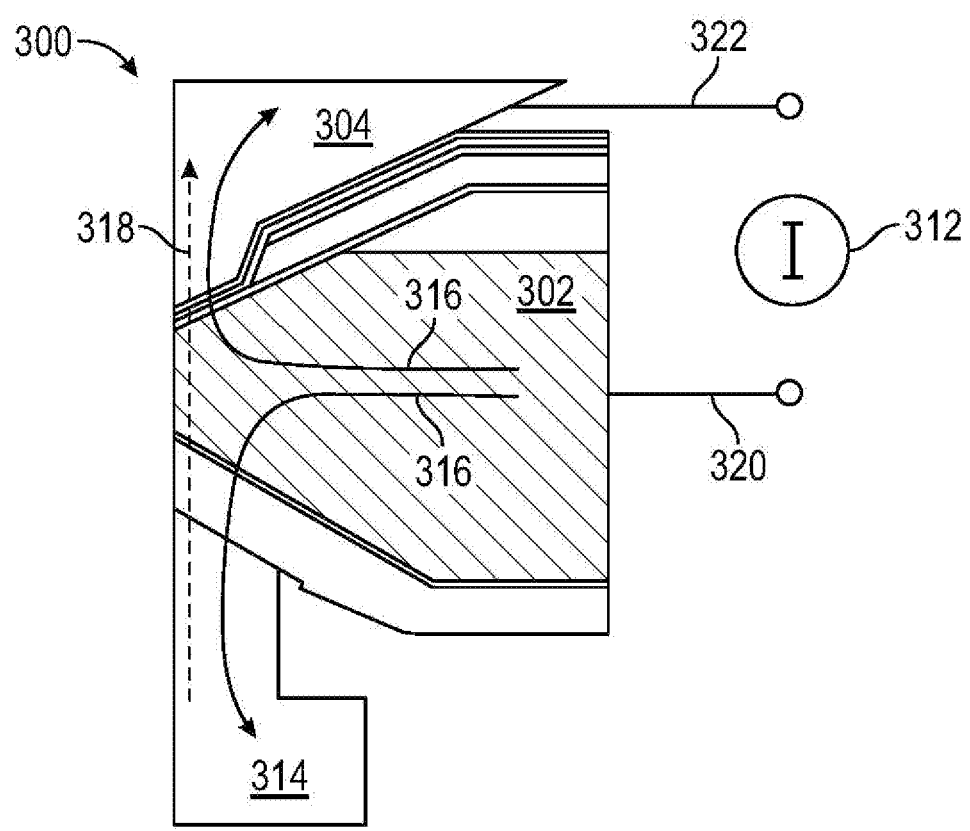
FIG. 3B illustrates a cross-sectional view of the write head of FIG. 3A showing the flow of electrons when current is applied, according to one embodiment.

FIG. 3B illustrates a cross-sectional view of the write head 300 showing the flow of electrons 316 when current (I) 312 is applied, according to one embodiment. In the write head 300, a first current lead 320 is connected to the main pole 302 to act as a source, and a second current lead 322 is connected to the trailing shield 304 to act as a ground. As current 312 is applied to the first current lead 320, the electrons 316 flow towards a leading shield 314, the trailing shield 304, and the side shield 306 (not shown). However, since the trailing shield 304 is grounded by the second current lead 322, the electrons 316 ultimate flow towards the trailing shield 304 to ground, as shown by the arrow 318.

Figure 4A:
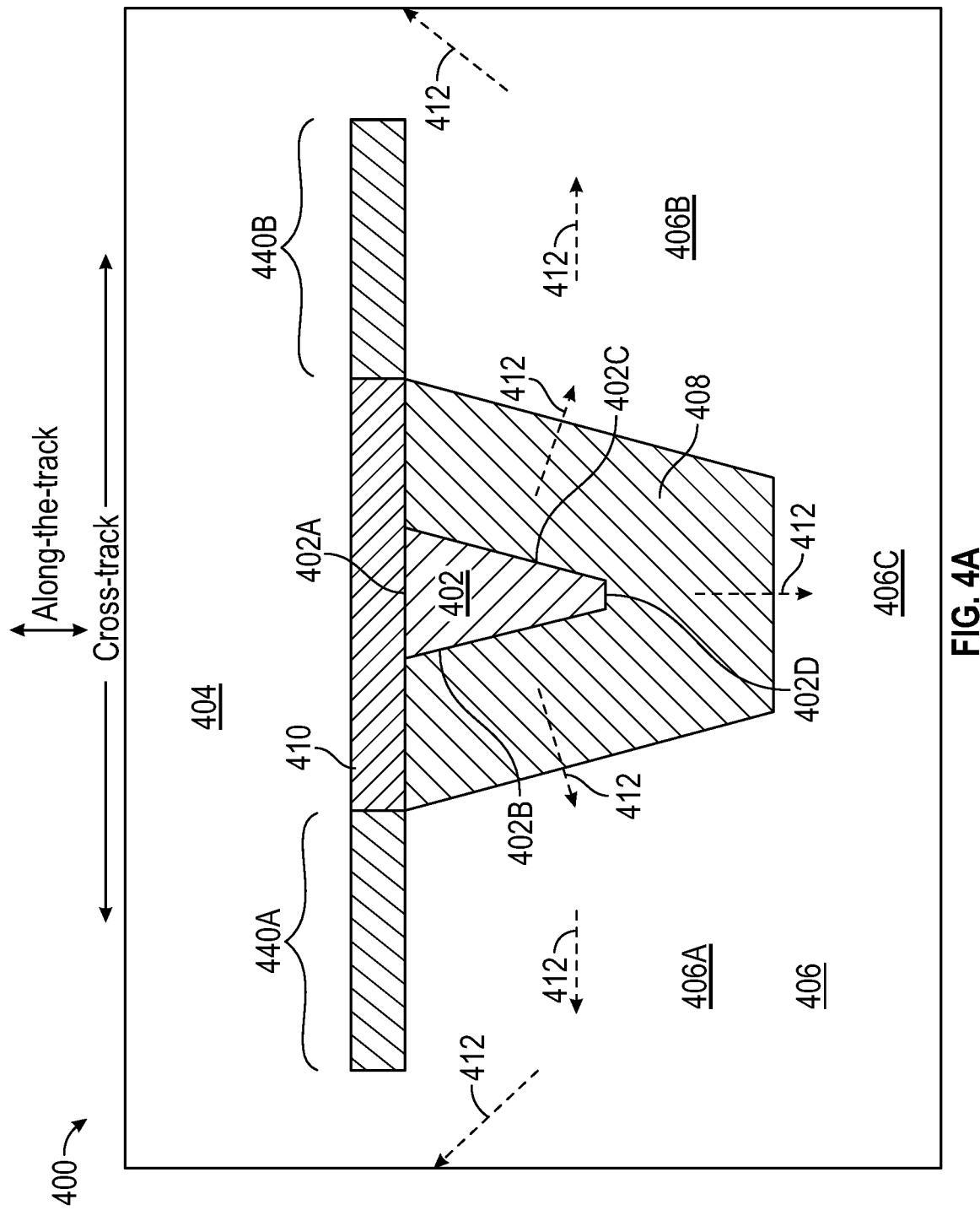
FIG. 4A illustrates a media facing surface view of a write head, according to another embodiment.

FIG. 4A illustrates a MFS view of a write head 400, according to another embodiment. The write head 400 may be the write head 29b of FIGS. 2A-2D. The write head 400 comprises a main pole 402 disposed below a trailing shield 404. The main pole 402 may be the main pole 141 of FIGS. 2A-2D. A trailing gap 410 is disposed between the main pole 402 and the trailing shield 404, and has a greater cross-track width than the main pole 402. A first surface 402A of the main pole 402 is in contact with the trailing gap 410. The trailing gap 410 comprises a non-magnetic non-conductive material (i.e., a non-magnetic electrically-insulating material), such as alumina, or an electrically insulating, thermally conductive material, such as silicon nitride (SiN). The trailing gap 410 may further comprise a dielectric layer (not shown) disposed adjacent to the trailing shield 404. The trailing gap 410 may have a thickness of about 12 to 30 nm in the along-the-track direction. While not shown in the write head 400, a hot seed layer may be disposed between the trailing gap 410 and the trailing shield 404.

A second surface 402B, a third surface 402C, and a fourth surface 402D of the main pole 402 are surrounded by a side shield 406 comprised of three cohesive sections 406A, 406B, 406C. The section 406C of the side shield 406 disposed below the main pole 402 on the side opposite the trailing shield 404 may be considered a leading shield. The side shield 406 is disposed below the trailing shield 404 and the trailing gap 410, and sections 406A and 406B of the side shield 406 are in contact with the trailing gap 410. A side gap 408 is disposed between the main pole 402 and each section 406A, 406B, 406C of the side shield 406. The side gap 408 is in contact with the main pole 402, the trailing gap 410, and the side shield 406. The side gap 408 comprises a non-magnetic electrically-conductive material. The side gap 408 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. While the main pole 402 is described as having four surfaces 402A-402D, the main pole 402 may comprise three surfaces.

In one embodiment, a non-magnetic electrically-conductive material may be disposed in the trailing gap 410 in the first overhang portion 440A and the second overhang portion 440B. In such an embodiment, the portion of the trailing gap 410 disposed between the first overhang portion 440A and the second overhang portion 440B (i.e., the portion of the trailing gap 410 aligned with the main pole 402 and/or the side gap 308) comprises a non-magnetic non-conductive material or a non-magnetic electrically-insulating material. The non-magnetic electrically-conductive material disposed within the trailing gap 410 in the first overhang portion 440A and the second overhang portion 440B may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. The non-magnetic electrically-conductive material disposed within the trailing gap 410 in the first overhang portion 440A and the second overhang portion 440B may comprise the same material as the side gap 408, or may comprise a different material than the side gap 408.

The current 412, represented by the arrows labeled 412, flows from the main pole 402 to the side shield 406, which reduces the hot spot near the main pole 402 by dissipating heat into the side shield 406. As such, the side gap 408 comprising an electrically-conductive material offers a current 412 flow path to further reduce electrical resistance, reduce temperature rise, and improve reliability performance. For example, when applying current 412 to the write head 400, the write head 400 may have a device resistance of about 6.5 ohms and a temperature increase of about 40 degrees Celsius.

Figure 4B:
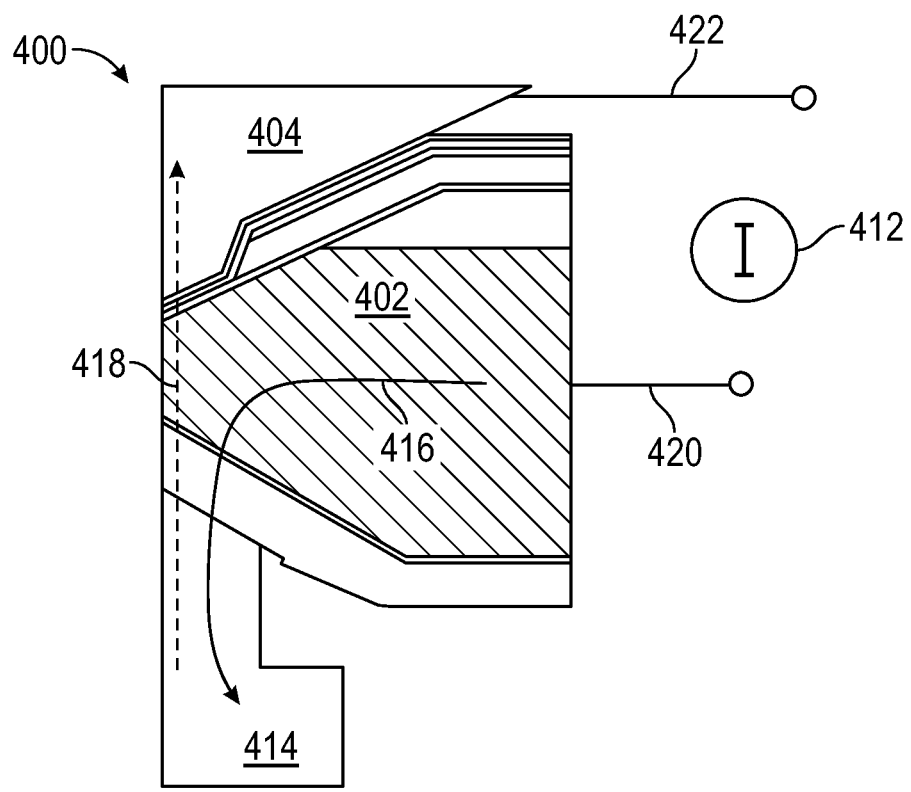
FIG. 4B illustrates a cross-sectional view of the write head of FIG. 4A showing the flow of electrons when current is applied, according to another embodiment.

FIG. 4B illustrates a cross-sectional view of the write head 400 showing the flow of electrons 416 when current (I) 412 is applied, according to one embodiment. In the write head 400, a first current lead 420 is connected to the main pole 402 to act as a source, and a second current lead 422 is connected to the trailing shield 404 to act as a ground. As current 412 is applied to the first current lead 420, the electrons 416 flow towards a leading shield 414 and the side shield 406 (not shown). The electrons 416 do not immediately flow from the main pole 402 towards the trailing shield 404, as the trailing gap 410 comprises a non-conductive material. However, since the trailing shield 404 is grounded by the second current lead 422, the electrons 416 ultimate flow towards the trailing shield 404 to ground, as shown by the arrow 418.

Figure 5A:
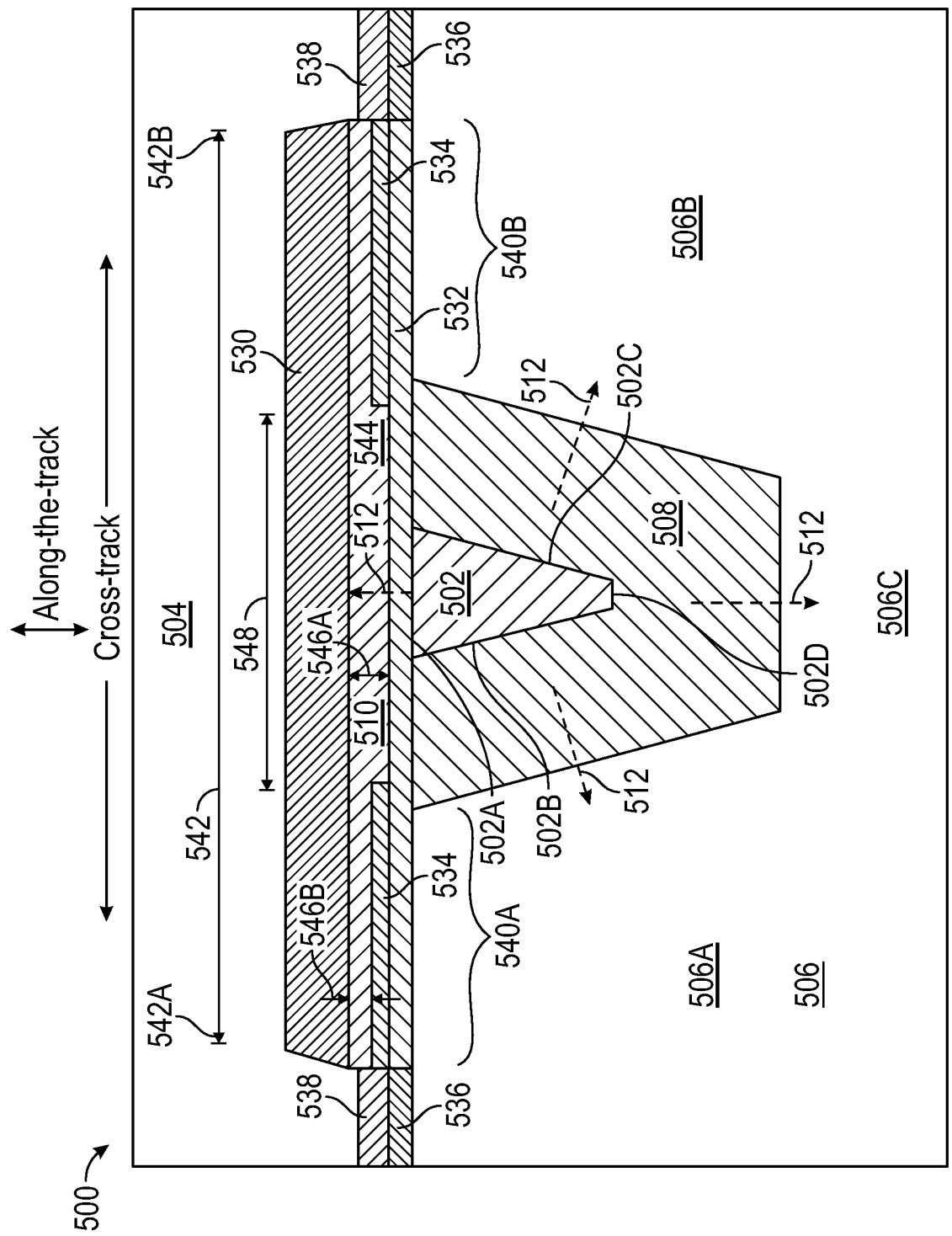
FIG. 5A illustrates a media facing surface view of a write head, according to one embodiment.

FIG. 5A illustrates a MFS view of a write head 500, according to one embodiment. The write head 500 may be the write head 29b of FIGS. 2A-2D. The write head 500 comprises a main pole 502 disposed below a trailing shield 504. The main pole 502 may be the main pole 141 of FIGS. 2A-2D. A trailing gap 510 is disposed between the main pole 502 and the trailing shield 504, and has a greater cross-track width 542 than the main pole 502. A first surface 502A of the main pole 502 is in contact with the trailing gap 510. The width 542 of the trailing gap 510 is defined by a first end 542A and a second end 542B opposite the first end 542A. The trailing gap 510 may have a thickness of about 12 to 30 nm in the along-the-track direction. A hot seed layer 530 is disposed between the trailing gap 510 and the trailing shield 504.

A second surface 502B, a third surface 502C, and a fourth surface 502D of the main pole 502 are surrounded by a side shield 506 comprised of three sections 506A, 506B, 506C. The section 506C of the side shield 506 disposed below the main pole 502 on the side opposite the trailing shield 504 may be considered a leading shield. The side shield 506 is disposed below the trailing shield 504 and the trailing gap 510, and sections 506A and 506B of the side shield 506 are in contact with the trailing gap 510. A side gap 508 is disposed between the main pole 502 and each section 506A, 506B, 506C of the side shield 506. The side gap 508 is in contact with the main pole 502, the trailing gap 510, and the side shield 506. The side gap 508 comprises a non-magnetic electrically-conductive material. The side gap 508 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. The non-magnetic electrically-conductive material of the trailing gap 510 may be the conductive layer 190 of FIGS. 2A-2D. While the main pole 502 is described as having four surfaces 502A-502D, the main pole 502 may comprise three surfaces.

The trailing gap 510 comprises portions or regions of varying materials. A first portion 544 of the trailing gap 510 spanning the width 542 of the trailing gap 510 is in contact with the hot seed layer 530. The first portion 544 comprises a non-magnetic electrically-conductive material. The first portion 544 may comprise the same material as the side gap 508, or the first portion 544 may comprise a different material than the side gap 508. A second portion 532 is disposed between the first portion 544 and the main pole 502, and spans the width 542 of the trailing gap 510. The second portion 532 comprises a conductive material. Both the first portion 544 and the second portion 532 may individually comprise Cu, Au, Ag, Ru, Cr, W, Mo, Ni, Ta, Pt or Rh or their alloys, or a multilayer of those materials, like a NiCr/Ru/NiTa multilayer. The first portion 544 and the second portion 532 may comprise the same material, or the first portion 544 and the second portion 532 may comprise different materials. The trailing gap 510 may further comprise a dielectric layer (not shown) disposed between the trailing shield 504 and the first portion 544.

A first overhang portion 540A is defined from the first end 542A of the trailing gap 510 to a surface of the side gap 508 disposed adjacent to a first section 506A of the side shield 506. Similarly, a second overhang portion 540B is defined from the second end 542B of the trailing gap 510 to a surface of the side gap 508 disposed adjacent to a second section 506B of the side shield 506. A blocker layer 534 is disposed within the trailing gap 510 in both the first overhang portion 540A and the second overhang portion 540B. The blocker layers 534 comprise an insulating material, such as silicon nitride or aluminum oxide (AlO). The blocker layers 534 block current 512 from flowing directly from the first section 506A and the second section 506B of the side shield 506 to the trailing shield 504. The blocker layers 534 may have a cross-track width of about 4 nm to about 10 nm, such as about 6 nm. In the write head 500, the first portion 544 of the trailing gap 510 may have a first thickness 546A above the main pole 502, and a second thickness 546B above the blocker layers 534, the first thickness 546A being greater than the second thickness 546B.

An opening or window 548 is disposed between the blocker layers 534. The window 548 allows current 512, represented by the arrows labeled 512, to flow from the main pole 502 to the trailing shield 504. However, current 512 is blocked from flowing to the trailing shield 504 in the first and second overhang portions 540A, 540B where the blocker layers 534 are disposed. Thus, current 512 flows from the main pole 502 to the trailing shield 504 through the window 548 and to the side shield 506. As such, heat may dissipate to the side shield 506 and trailing shield 504. When applying current 512 to the write head 500, the write head 500 may have a device resistance of about 5.5 ohms to about 7.0 ohms and a temperature increase of about 25 degrees Celsius to about 50 degrees Celsius.

An insulating layer 536 is disposed adjacent to both the first end 542A and the second end 542B of the trailing gap 510. The insulating layers 536 are each in contact with the second portion 532, and may have the same thickness as the second portion 532. A conductive layer 538 is disposed adjacent to both the first end 542A and the second end 542B of the trailing gap 510 between the insulating layers 536 and the trailing shield 504. Thus, the insulating layers 536 are in contact with the first section 506A and the second section 506B of the side shield 506, and the conductive layers 538 are in contact with the trailing shield 504, the insulating layers 536, and the first portion 544 of the trailing gap 510. The insulating layers 536 block current 512 from flowing from the side shield 506 around the trailing gap 510 to the trailing shield 504. The trailing gap 510 and the side gap 508 each comprising an electrically-conductive material enables the trailing gap 510 and the side gap 508 to act as a conductor having an increased area. Increasing the area of the conductor allows the conductor to act as a heat sink, which reduces both the electrical resistance and temperature rise during operation of the write head 500 to improve reliability.

Figure 5B:
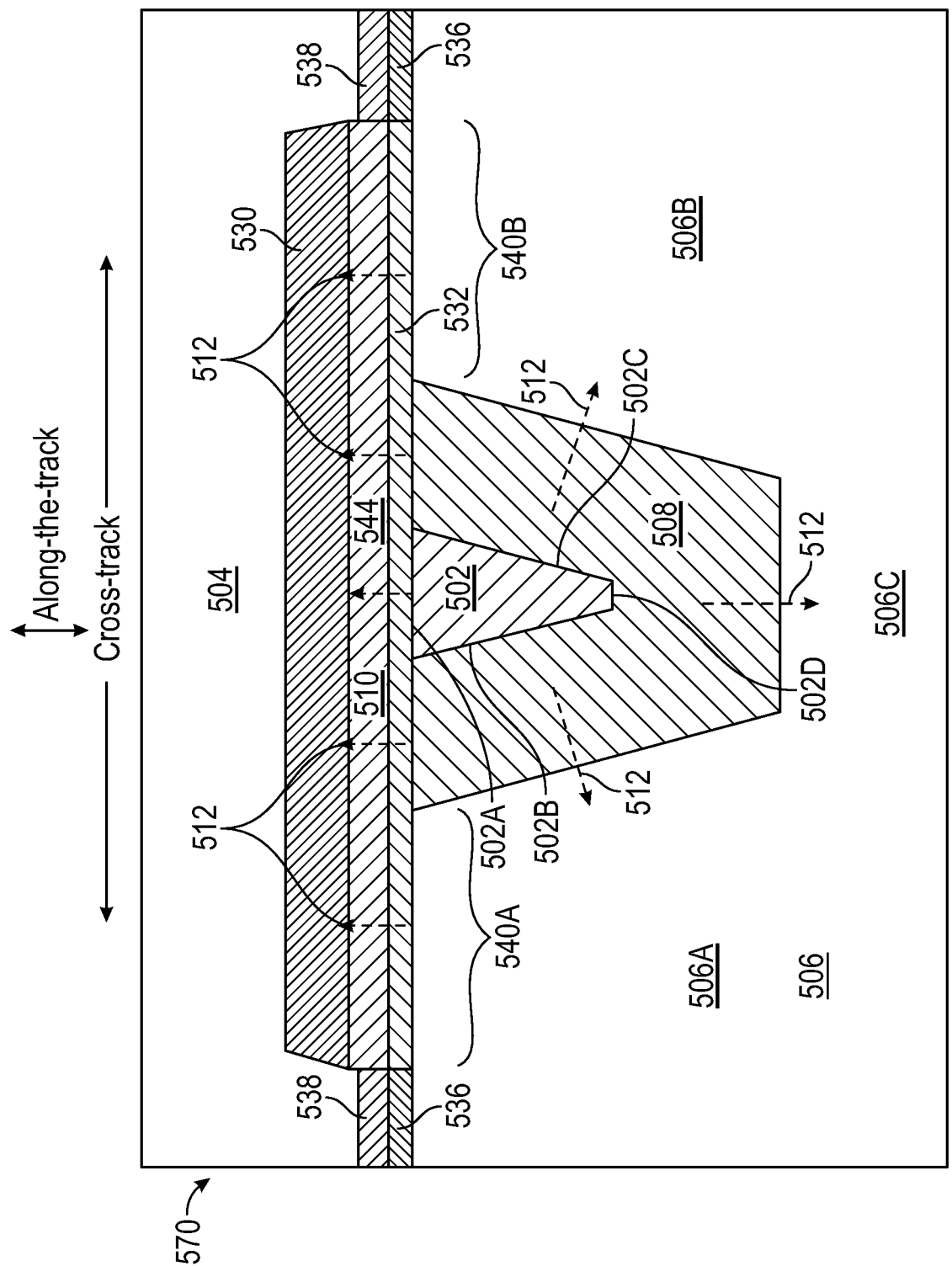
FIG. 5B illustrates a media facing surface view of a write head, according to another embodiment.

FIG. 5B illustrates a MFS view of a write head 570, according to another embodiment. The write head 570 may be the write head 29b of FIGS. 2A-2D. The write head 570 is the same as the write head 500 of FIG. 5A; however, the write head 570 does not comprise blocker layers 534 within the trailing gap 510 in the first and second overhang portions 540A, 540B. Rather, the trailing gap 510 comprises only the first portion 544 comprises a non-magnetic electrically-conductive material, and the second portion 532 comprising a conductive material. Both the first portion 544 and the second portion 532 may individually comprise Cu, Au, Ag, Ru, Cr, W, Mo, Ni, Ta, Pt or Rh or their alloys, or a multilayer of those materials, like a NiCr/Ru/NiTa multilayer. The first portion 544 and the second portion 532 may comprise the same material, or the first portion 544 and the second portion 532 may comprise different materials. The trailing gap 510 may further comprise a dielectric layer (not shown) disposed between the trailing shield 504 and the first portion 544.

Since the write head 570 does not comprise the blocker layers 534 within the trailing gap 510 in the first and second overhang portions 540A, 540B, current 512 may flow from the main pole 502 to the side shield 506 and to trailing shield 504, which reduces the hot spot near the main pole 502. As such, heat may dissipate to the side shield 506 and trailing shield 504. Since a greater amount of current 512 is enabled to flow from the main pole 502 to the trailing shield 504 in the write head 570 than in the write head 500, more heat may be dissipated to the trailing shield 504 in the write head 570. When applying current 512 to the write head 570, the write head 570 may have a device resistance of about 5.5 ohms to about 7.0 ohms and a temperature increase of about 25 degrees Celsius to about 50 degrees Celsius. The trailing gap 510 and the side gap 508 each comprising an electrically-conductive material enables the trailing gap 510 and the side gap 508 to act as a conductor having an increased area. Increasing the area of the conductor allows the conductor to act as a heat sink, which reduces both the electrical resistance and temperature rise during operation of the write head 570 to improve reliability.

Figure 5C:
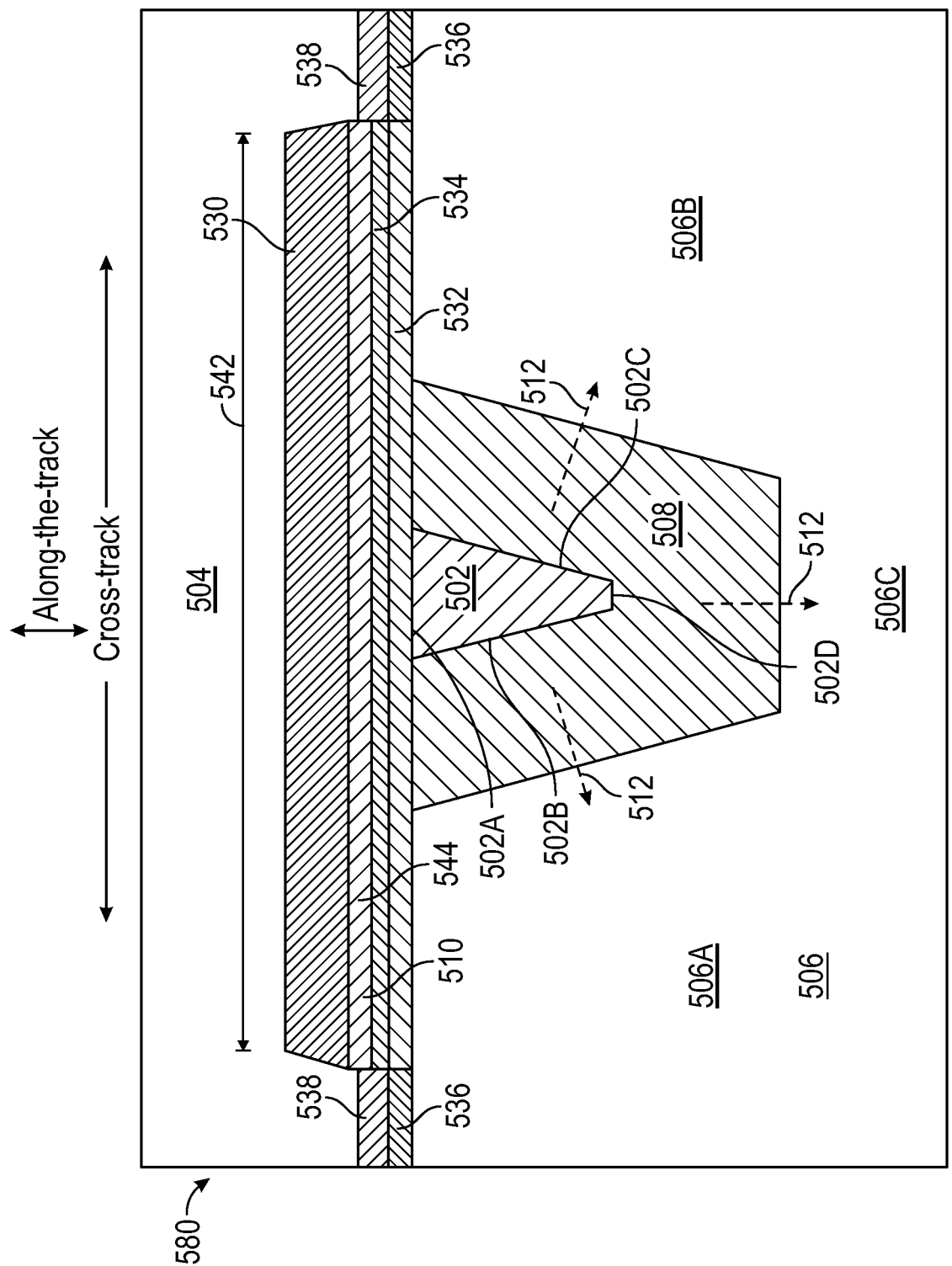
FIG. 5C illustrates a media facing surface view of a write head, according to yet another embodiment.

FIG. 5C illustrates a MFS view of a write head 580, according to another embodiment. The write head 580 may be the write head 29b of FIGS. 2A-2D. The write head 580 is the same as the write head 500 of FIG. 5A; however, the blocker layer 534 extends the width 542 of the trailing gap 510 in the write head 580. As such, trailing gap 510 comprises the first portion 544 comprising a non-magnetic electrically-conductive material in contact with the hot seed layer 530, the second portion 532 comprising a conductive material disposed above the main pole 502, and the blocker layer 534 disposed between the first portion 544 and the second portion 532. Both the first portion 544 and the second portion 532 may individually comprise Cu, Au, Ag, Ru, Cr, W, Mo, Ni, Ta, Pt or Rh or their alloys, or a multilayer of those materials, like a NiCr/Ru/NiTa multilayer. The first portion 544 and the second portion 532 may comprise the same material, or the first portion 544 and the second portion 532 may comprise different materials. The blocker layer 534 comprises an insulating material, such as silicon nitride. The trailing gap 510 may further comprise a dielectric layer (not shown) disposed between the trailing shield 504 and the first portion 544.

The blocker layer 534 spanning the width 542 of the trailing gap 510 blocks current 512 from directly flowing from the main pole 502 to the trailing shield 504. Thus, the current 512 flows from the main pole 502 to the side shield 506, allowing heat to dissipate to the side shield 506. When applying current to the write head 580, the write head 580 may have a device resistance of about 5.5 ohms to about 7.0 ohms and a temperature increase of about 25 degrees Celsius to about 50 degrees Celsius. The trailing gap 510 and the side gap 508 each comprising an electrically-conductive material enables the trailing gap 510 and the side gap 508 to act as a conductor having an increased area. Increasing the area of the conductor allows the conductor to act as a heat sink, which reduces both the electrical resistance and temperature rise during operation of the write head 580 to improve reliability.

Figure 6A:
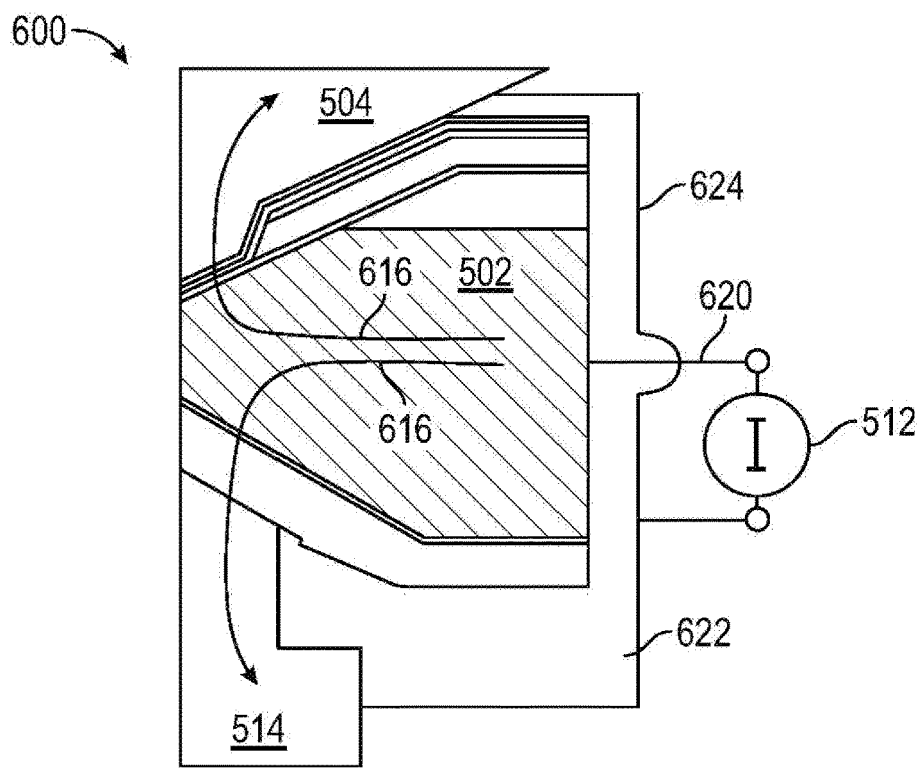
FIG. 6A illustrates a cross-section view of a terminal connection configuration for the write heads of FIG. 5A-5C, according to one embodiment.

FIG. 6A illustrates a cross-section view of a terminal connection configuration 600 for the write head 500 of FIG. 5A, the write head 570 of FIG. 5B, and/or the write head 580 of FIG. 5C, according to one embodiment. A first current lead 620 is connected to the main pole 502, a second current lead 622 is connected to the leading shield 514, and a third current lead 624 is connected to the trailing shield 504. The first current lead 620 is a source while the second and third current leads 622, 624 are grounds. Thus, as current (I) 512 flows from the main pole 502, electrons 616 may ground to the leading shield 514 and/or the trailing shield 504. While shown as a three terminal configuration 600, the configuration 600 may be a two terminal configuration.

Figure 6B:
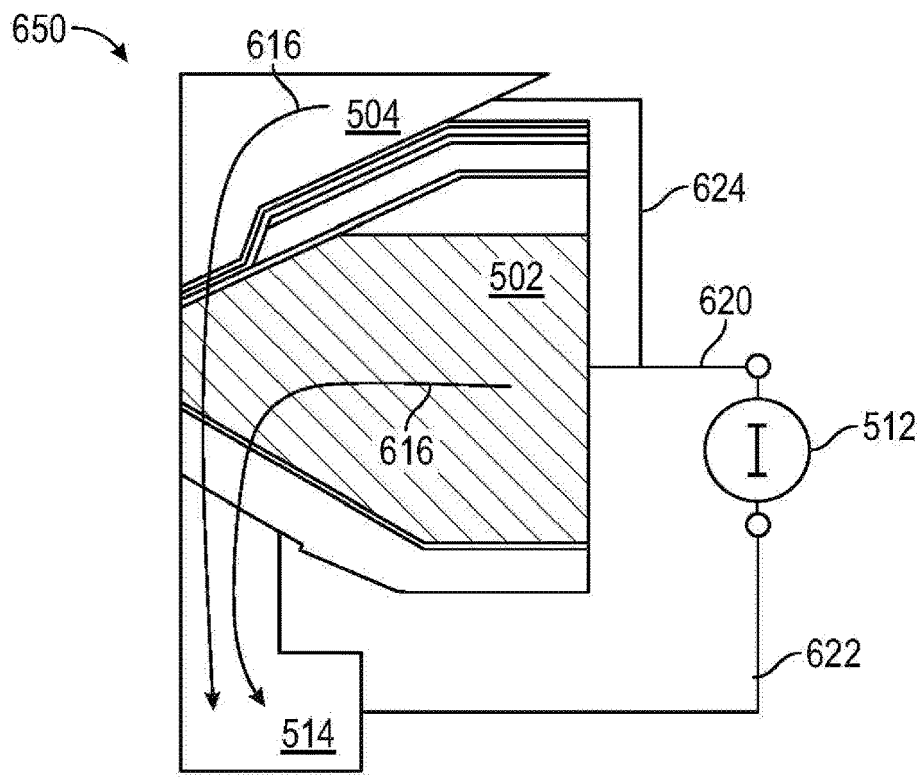
FIG. 6B illustrates a cross-section view of a terminal connection configuration for the write heads of FIG. 5A-5C, according to another embodiment.

FIG. 6B illustrates a cross-section view of a terminal connection configuration 650 for the write head 500 of FIG. 5A, the write head 570 of FIG. 5B, and/or the write head 580 of FIG. 5C, according to another embodiment. A first current lead 620 is connected to the main pole 502, a second current lead 622 is connected to the leading shield 514, and a third current lead 624 is connected to the trailing shield 504. The first and third current leads 620, 624 are sources while the second current lead 622 is a ground. Thus, as current (I) 512 flows, electrons 616 ground to the leading shield 514. While shown as a three terminal configuration 650, the configuration 650 may be a two terminal configuration.

In each of the above-described write head embodiments, high amounts of current can be applied without negatively impacting the reliability of the write heads, which enhances performance gain of the write heads. Utilizing one or more regions comprising a non-magnetic electrically-conductive material allow such regions to act as a heat sink in order to dissipate heat away from the main pole, lowering the resistance and temperature rise due to heating. As such, device resistance and temperature increases are reduced or minimized in each of the above-described write head embodiments when high amounts of current are applied, preventing materials in the write head from corroding. Furthermore, the bit rate per minute capabilities are increased, and the SER is decreased in each of the above-described write head embodiments, resulting in improved main pole magnetization switching.

In one embodiment, a magnetic recording write head comprises a main pole, a trailing shield disposed above the main pole, and a trailing gap disposed between the main pole and the trailing shield, the trailing gap in contact with a first surface of the main pole. A first portion of the trailing gap and a second portion of the trailing gap each comprise a non-magnetic electrically-conducting material. The write head further comprises a side shield surrounding a second surface, a third surface, and a fourth surface of the main pole, the side shield being in contact with and disposed below the trailing shield and the trailing gap, and a side gap disposed between the side shield and the second, third, and fourth surfaces of the main pole, the side gap being in contact with the trailing gap. The side gap comprises a non-magnetic electrically-conducting material. The magnetic recording head may further comprise a hot seed layer disposed between the trailing gap and the trailing shield.

A third portion of the trailing gap may comprise a blocker material. The blocker material may have the same cross-track width as the trailing gap. The blocker material may be disposed between the first portion and the second portion. The blocker material may be disposed in a first overhang portion and a second overhang portion. The blocker material may comprise silicon nitride. An insulating layer may be disposed adjacent to a first end of the trailing gap and to a second end of the trailing gap. The write head may have a three terminal connection configuration. The write head may have a two terminal connection configuration. The trailing gap may have a greater cross-track width than the main pole.

In another embodiment, a magnetic recording write head comprises a main pole, a trailing shield disposed above the main pole, and a trailing gap disposed between the main pole and the trailing shield, the trailing gap in contact with a first surface of the main pole. The trailing gap comprises an electrically-insulating material. The write head further comprises a side shield surrounding a second surface, a third surface, and a fourth surface of the main pole, the side shield being in contact with and disposed below the trailing shield and the trailing gap, and a side gap disposed between the side shield and the second, third, and fourth surfaces of the main pole, the side gap comprising a non-magnetic electrically-conducting material.

The side gap may comprise a material selected from the group consisting of: Cu, Au, Ag, Ru, Cr, W, Mo, Ni, Ta, Pt, Rh, and alloys thereof. A first current lead may be connected to the main pole and acts as a source, and a second current lead may be connected to the trailing shield and acts as a ground. The trailing gap may comprise alumina. The trailing gap may have a greater cross-track width than the main pole.

In yet another embodiment, a magnetic recording write head comprises a main pole, a trailing shield disposed above the main pole, and a trailing gap disposed between the main pole and the trailing shield, the trailing gap in contact with a first surface of the main pole. The trailing gap comprises a non-magnetic electrically-conducting material. The write head further comprises a side shield surrounding a second surface, a third surface, and a fourth surface of the main pole, the side shield being in contact with and disposed below the trailing shield and the trailing gap, and a side gap disposed between the side shield and the second, third, and fourth surfaces of the main pole the side gap being in contact with the trailing gap. The side gap comprises a non-magnetic electrically-conducting material.

The trailing gap may comprise a material selected from the group consisting of: Cu, Au, Ag, Ru, Cr, W, Mo, Ni, Ta, Pt, Rh, and alloys thereof. The trailing gap and the side gap may comprise the same material. The trailing gap and the side gap may comprise different materials. The trailing gap may have a greater cross-track width than the main pole.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording write head, comprising:
   a main pole;
   a trailing shield disposed above the main pole;
   a trailing gap disposed between the main pole and the trailing shield, wherein:
     a first layer of the trailing gap and a second layer of the trailing gap each comprises a non-magnetic electrically-conducting material,
     the second layer of the trailing gap is disposed in contact with a first surface of the main pole and spaced from the trailing shield, and the first layer of the trailing gap is disposed adjacent to the trailing shield and spaced from the first surface of the main pole, and
     a third layer of the trailing gap comprises a blocker material, the blocker material having a same cross-track width as the trailing gap;
   a side shield surrounding a second surface, a third surface, and a fourth surface of the main pole, the side shield being disposed below the trailing shield and the trailing gap; and
   a side gap disposed between the side shield and the second, third, and fourth surfaces of the main pole, the side gap being in contact with the trailing gap, wherein the side gap comprises a non-magnetic electrically-conducting material, and wherein the first layer of the trailing gap has a greater cross-track width than the main pole and the side gap.

2. The magnetic recording write head of claim 1, wherein the second layer of the trailing gap has a greater cross-track width than the main pole.

3. The magnetic recording write head of claim 1, further comprising a hot seed layer disposed between the trailing gap and the trailing shield, wherein the first layer is disposed in contact with the hot seed layer.

4. The magnetic recording write head of claim 1, wherein the blocker material is disposed between the first layer and the second layer.

5. The magnetic recording write head of claim 1, wherein the blocker material is disposed in a first overhang portion and a second overhang portion.

6. The magnetic recording write head of claim 1, wherein the blocker material comprises silicon nitride.

7. The magnetic recording write head of claim 1, wherein an insulating layer is disposed adjacent to a first end of the trailing gap and to a second end of the trailing gap.

8. The magnetic recording write head of claim 1, wherein the write head has a three terminal connection configuration.

9. A magnetic recording drive comprising the magnetic recording write head of claim 1.

10. A magnetic recording write head, comprising:
    a main pole;
    a trailing shield disposed above the main pole;
    a trailing gap disposed between the main pole and the trailing shield, the trailing gap comprising a first overhang portion, a second overhang portion, and a central portion disposed between the first and second overhang portions, the central portion being disposed in contact with a first surface of the main pole, wherein the central portion of the trailing gap comprises an electrically-insulating material, and wherein a non-magnetic electrically-conducting layer extends from the first overhang portion through the central portion to the second overhang portion, the non-magnetic electrically-conducting layer having a greater cross-track width than the main pole;

a side shield surrounding a second surface, a third surface, and a fourth surface of the main pole, the side shield being disposed below the trailing shield and the trailing gap, wherein the non-magnetic electrically-conducting layer is disposed in contact with the side shield; and a side gap disposed between the side shield and the second, third, and fourth surfaces of the main pole, the side gap comprising a non-magnetic electrically-conducting material.

11. The magnetic recording write head of claim 10, wherein the side gap comprises a material selected from the group consisting of: Cu, Au, Ag, Ru, Cr, W, Mo, Ni, Ta, Pt, Rh, and alloys thereof.

12. The magnetic recording write head of claim 10, wherein a first current lead is connected to the main pole and acts as a source, and a second current lead is connected to the trailing shield and acts as a ground.

13. The magnetic recording write head of claim 10, wherein the trailing gap comprises alumina.

14. The magnetic recording write head of claim 10, wherein the central portion, the first overhang portion, and the second overhang portion of the trailing gap each has a same thickness, and wherein the central portion further comprises a non-magnetic electrically-conducting layer.

15. A magnetic recording drive comprising the magnetic recording write head of claim 10.

16. A magnetic recording write head, comprising:

a main pole;

a trailing shield disposed above the main pole, the trailing shield comprising a hot seed layer;

a trailing gap disposed between the main pole and the hot seed layer, the trailing gap comprising:

a first layer disposed in contact with the hot seed layer and spaced from a first surface of the main pole, a second layer disposed in contact with the first surface of the main pole and spaced from the hot seed layer, wherein the first and second layers of the trailing gap each comprises a non-magnetic electrically-conducting material, and a third layer comprising a blocker material disposed between the first layer and the second layer, the third layer having a same cross-track width as the trailing gap;

a side shield surrounding a second surface, a third surface, and a fourth surface of the main pole, the side shield being disposed below the trailing shield and the trailing gap; and a side gap disposed between the side shield and the second, third, and fourth surfaces of the main pole, the side gap being in contact with the trailing gap, wherein the side gap comprises a non-magnetic electrically-conducting material, and wherein the first and second layers of the trailing gap each has a greater cross-track width than the main pole and the side gap.

17. The magnetic recording write head of claim 16, wherein the trailing gap comprises a material selected from the group consisting of: Cu, Au, Ag, Ru, Cr, W, Mo, Ni, Ta, Pt, Rh, and alloys thereof.

18. The magnetic recording write head of claim 16, wherein the trailing gap and the side gap comprise the same material.

19. The magnetic recording write head of claim 16, wherein the trailing gap and the side gap comprise different materials.

20. The magnetic recording write head of claim 16, wherein the first layer and the second layer of the trailing gap comprise different materials.

21. The magnetic recording write head of claim 16, wherein the blocker material is disposed in a first overhang portion and a second overhang portion of the trailing gap.

22. A magnetic recording drive comprising the magnetic recording write head of claim 16.

* * * * *